(12) United States Patent
Dillaway (10) Patent No.: US 8,687,804 B2
(45) Date of Patent: Apr. 1, 2014

(54) SEPARATING CONTROL AND DATA OPERATIONS TO SUPPORT SECURED DATA TRANSFERS (75) Inventor: Blair B. Dillaway, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1293 days.

(21) Appl. No.: 11/555,578

(22) Filed: Nov. 1, 2006

(65) Prior Publication Data

US 2008/0101598 A1  May 1, 2008

(51) Int. Cl.
H04L 9/00 (2006.01)
H04L 29/06 (2006.01)
G06F 7/04 (2006.01)
G06F 15/16 (2006.01)
G06F 17/30 (2006.01)

(52) U.S. Cl.
USPC .......... 380/44; 713/151; 713/163; 726/3; 726/4

(58) Field of Classification Search
USPC .............. 380/44; 726/3, 4; 713/151, 163
See application file for complete search history.

(56) References Cited

U.S. PATENT DOCUMENTS 6,317,831 B1 * 11/2001 King .................. 713/171
6,760,840 B1 * 7/2004 Shimbo et al. ........... 713/165
2004/0184615 A1 * 9/2004 Elliott et al. ............ 380/283
2005/0027979 A1 * 2/2005 Peck et al. ............. 713/161
2005/0251500 A1 * 11/2005 Vahalia et al. ........... 707/1
2007/0022475 A1 * 1/2007 Rossi et al. ............. 726/14

OTHER PUBLICATIONS

Bailey et al, "The Architecture of Direct Data Placement (DDP) and Remote Direct Memory Access (RDFA) on Internet Protocols" Network Working Group, Dec. 2005, 24 pgs.
Dierks et al, "The TLS Protocol Version 1.0", Network Working Group, Jan. 1999, 84 pgs.
Harkin et al, "The Internet Key Exchange (IKE)", Network Working Group, Nov. 1998, 44 pgs.
Kent, "IP Authentication Header", Network Working Group, Nov. 1998, 24 pgs.
Kent, "IP Encapsulating Security Payload (ESP)", Network Working Group, Nov. 1998, 24 pgs.
Romanow et al, "Remote Direct Memory Access (RDMA) over IP Problem Statement" Network Working Group, Dec. 2005, 22 pgs.
"The Open Group Debuts Open Source Licensing of DCE Source Code", The Open Group DCE Portal, Jan. 2005, 1 pgs.

* cited by examiner

Primary Examiner — Luu Pham
Assistant Examiner — Jahangir Kabir
(74) Attorney, Agent, or Firm — Stephen A. Wight; Carole Boelitz; Micky Minhas (57) ABSTRACT For a data transfer, security is negotiated via a control channel operating in accordance with a first protocol. The data is transmitted responsive to the security negotiation on a data channel operating in accordance with a second protocol. For example, a described implementation involves using a security control protocol and a separate secure data transfer protocol that operate cooperatively, but independently, to provide flexible application layer security with highly efficient data transfers.

19 Claims, 8 Drawing Sheets

SEPARATING CONTROL AND DATA OPERATIONS TO SUPPORT SECURED DATA TRANSFERS

BACKGROUND

The past decade has seen massive increases in the number of interconnected systems on the internet. Beneficiaries of this development include the scientific research community and businesses needing to model and analyze complex processes. Both types of users benefit from combining an application and relatively large amounts of data at one computational site. The data is usually stored in data repositories, such as file systems, databases, and so forth. These data repositories that hold an application's data are often located on different physical device(s) than the one hosting the application computation.

The computational device and the data repository devices may span a number of different locations with connectivity provided by standard networking technology. To perform the desired computation at a given site with a selected application, the targeted data is transferred from the data repositories storing the application's data to the computational site. Similarly, the results of the application's computation may be written back into one or more remote data repositories to ensure that the results are properly maintained and/or made available to other applications.

SUMMARY

For a data transfer, security is negotiated via a control channel operating in accordance with a first protocol. The data is transmitted responsive to the security negotiation on a data channel operating in accordance with a second protocol.

This Summary is provided to introduce a selection of concepts in a simplified form that are flier described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction to Secured Data Transfers Supported by Separated Control and Data Operations As described above, data that is to be the target of computing tasks may be located at remote data repositories. Computing applications and targeted data may be brought together at a single site by transferring the data from the data repositories to, for example, a site having the computing application. Users often want these data transfers to be secured in some manner and to some extent. This may include, by way of example but not limitation, authentication of the data requestor to ensure that it is authorized access, authentication of the data source to ensure it has the correct data, integrity and confidentiality protection while the data transits over the network, and so forth.

Similarly, an application's computation may result in one or more data sets that may need to be written to remote data repositories. The transmission of the results may be done due to local storage limitations, the need to ensure data is properly maintained, the need to make such data available to other applications, and so forth. Such transfers of results data to repositories can operate in the same manner as the transfer of the application's input data from the repositories. For example, data security may be negotiated and then applied to the results data flowing in the reverse direction from the application to the data repository or repository. The input data source repositories may be the same as or may be different from the results data destination repositories.

Current approaches provide an inadequate solution to this problem. On the one hand, there are channel-level security protocols such as IPsec (RFC 4301). This approach provides efficient point-to-point confidentiality for all interactions. This efficiency is achieved by bulk-encrypting all network traffic in the same way based on a negotiated security association. The IPSec security negotiation mechanism has limits in that: each negotiation is limited to establishing security for a single point-to-point IP-protocol connection; it considers only device-to-device interaction; and it cannot provide application-specific authentication or data security mechanisms.

On the other hand, existing application-level security protocols can provide per-application participant authentication and data security control. They are not, however, as efficient as desired for massive data transfers. First, there is a common design pattern of developing a security negotiation protocol for a specific transport protocol operating between two entities. For example, TLS/SSL (RFC 2246) may be used on top of HTTP or LDAP., or DCE Remote Procedure Call (The Open Group Document C706) may be used with RPC. In such systems, security is first negotiated between applications running on two devices, and a secure data channel is established using the same base protocol (HTTP, RPC, etc.). If one wishes to alter the security of the data channel, it is typically necessary to stop the data transfer, negotiate new security settings, and then re-start the data transfer.

The above approach limits potential efficiency of the data transfer in several ways. First, modifying security settings is typically a synchronous operation requiring a temporary halt in data transfers. Second, the control and data transfer protocols are statically determined and cannot be dynamically selected based on the data being transferred. This can force use of a message-oriented protocol for both control and data transfers even when a stream-oriented data protocol would be more efficient. Third, the security negotiation mechanisms are designed to establish security between two entities, and they are not amenable to dynamically selecting one or more data repository servers at run time.

In short, conventional approaches have a number of deficiencies. Applications are therefore forced to use solutions that are sub-optimal in one or more respects: Consequently, weaker than desired data confidentiality may be used in order to achieve a required level of efficiency. Channel security may be used with limited authentication of the parties involved. Or an existing application-level protocol may be employed with less efficiency than desired.

In contrast, certain implementations as described herein are capable of creating a set of linked application-level protocols that work together to provide (i) a flexible security control channel and (ii) a separate high efficiency secure data transport channel that can operate independently and in parallel. For example, a described implementation involves using a security control protocol and a separate secure data transfer protocol that operate cooperatively, but independently, to provide flexible application layer security with highly efficient data transfers. Mechanisms are described that bind the data security that is negotiated on a control channel with the data protocol used on the data channel.

Figure 1:
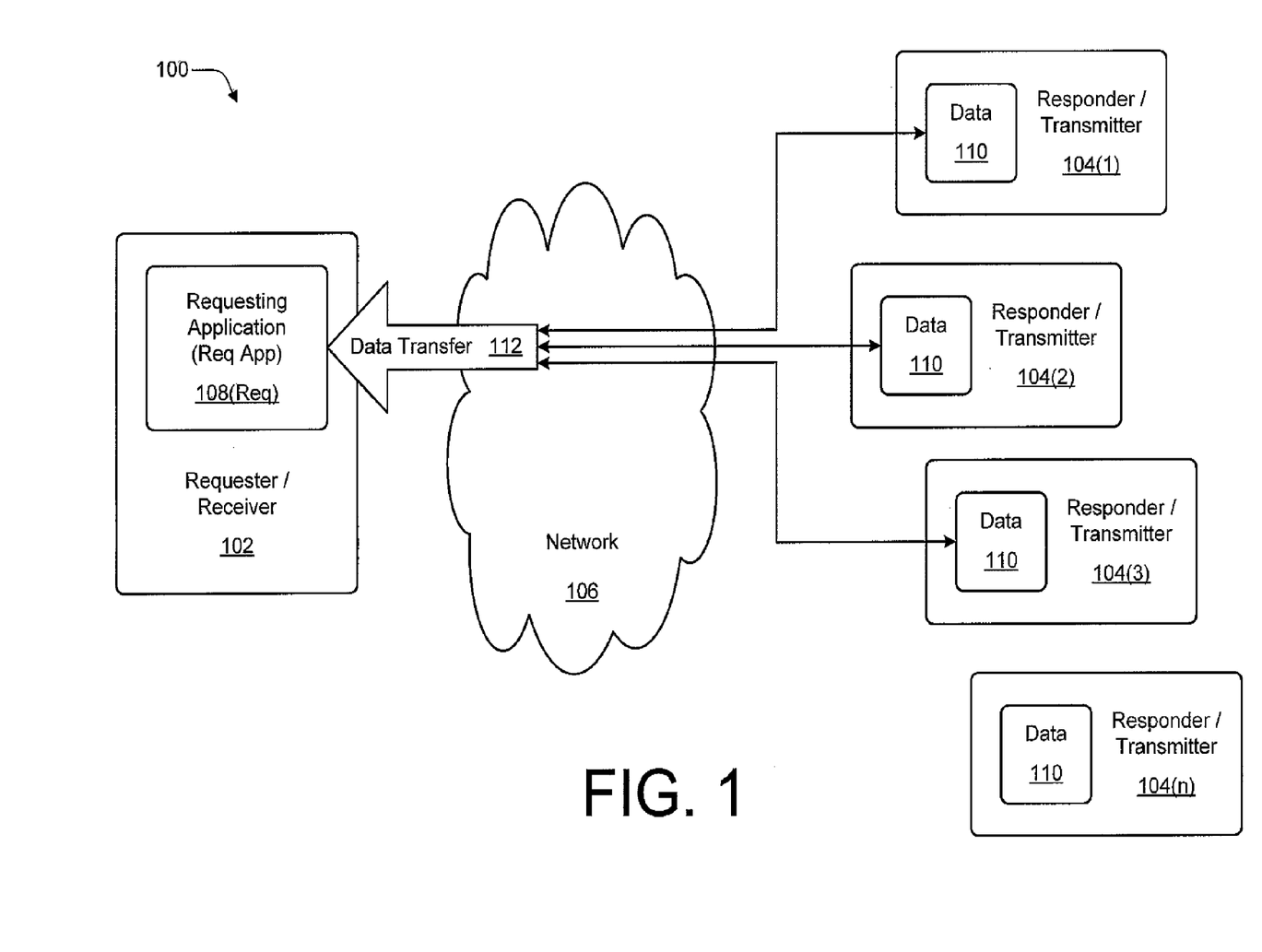
FIG. 1 is a block diagram illustrating an example data transfer across a network between a requester and multiple responders that store the data.

Example Environments for Secured Data Transfers Supported by Separated Control and Data Operations FIG. 1 is a block diagram illustrating an example data transfer 112 across a network 106 between a requester 102 and multiple responders 104 that store data 110. The block diagram represents an example environment 100 in which secure data transfers having separated control and data operations may be implemented. As illustrated, environment 100 includes a requester/receiver 102 and multiple responder/transmitters 104. Each requester/receiver 102 and responder/transmitter 104 may be realized with one or more devices. An example device is described herein below with particular reference to FIG. 8.

In a described implementation, requester/receiver 102 makes a request for data 110 and receives the requested data. Herein below, requester/receiver 102 is referred to as requester 102. Responder/transmitter 104 receives a request for data 110 and responds by transmitting the requested data. Herein below, responder/transmitter 104 is referred to as responder 104.

A data repository may be formed from one or more responders 104. In other words, each responder 104, either alone or in conjunction with other responder(s) 104, may represent a data repository. Each responder 104 includes data 110. Data 110 at each responder 104 may be a complete set of data, distinct and unrelated units of data, individual but related units of partial data, and so forth. There may also be a responder 104 that does not directly store any data 110, but it instead coordinates data transmissions from other responders 104 that do store data 110.

As illustrated, environment 100 includes "n" responders 104, with "n" representing some positive integer. Specifically, responder 104(1), responder 104(2), responder 104(3) . . . responder 104(n) are shown as being part of environment 100. Data transfer 112 involves three responders: responder 104(1), responder 104(2), and responder 104(3). However, a data transfer 112 may involve any number of responders 104 from one to "n".

Data transfer 112 is effectuated across network 106. For example, data 110 is transmitted from responders 104 to requester 102 across network 106. Network 106 may be any single network or combination of networks of any physical design, protocol operation, and so forth. Examples for network 106 include, but are not limited to, the internet, a local area network (LAN), a wide area network (WAN), a public or private network, a telephone network, a cellular network, a wireless network, a wired network, some combination thereof, and so forth.

Requester 102 includes a requesting application 108(req). Requesting application 108(req) makes a request for data 110 from at least one responder 104. Requesting application 108(req) also receives data 110 that is transmitted from the responder(s) 104. Requesting application 108(req) enables application-level security to be created and/or enforced for data transfer 112. Although not explicitly illustrated in FIG. 1, responders 104 may also include an application. Such an application, which is termed a responding application, for responders 104 is described herein below with particular reference to FIGS. 2 and 5.

Requesting application 108(req) may also wish to write one or more data sets resulting from its computation. These data results may be written to one or more data repositories. Such "reverse" data transfers can occur in a manner similar to that discussed above. In this case, requesting application 108(req) requests a data transfer to one or more responders 104. Requesting application 108(req) enables application-level security to be created and/or enforced for the "reverse" data transfer as well. However, the flow of data is reversed from that shown in the large arrow 112. In other words, as indicated by the smaller arrows, data transfers can originate at requester 102 and be received at responder(s) 104.

Figure 2:
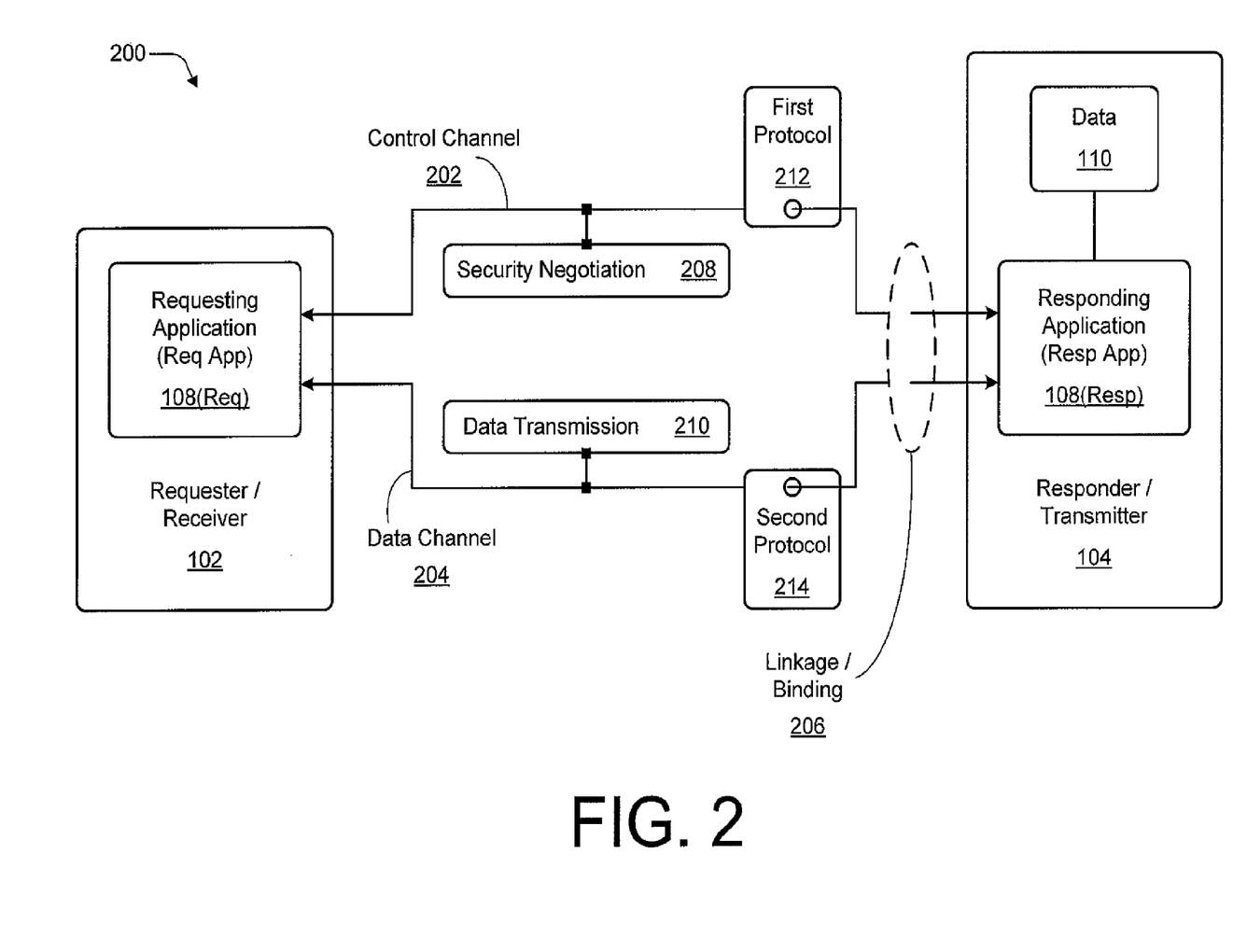
FIG. 2 is a block diagram illustrating an example data transfer between a requester and a responder using a control channel and a data channel.

Example Implementations for Secured Data Transfers Supported by Separated Control and Data Operations FIG. 2 is a block diagram illustrating an example data transfer between a requester 102 and a responder 104 using a control channel 202 and a data channel 204. The block diagram represents a paradigm 200 for secure data transfers having separated control and data operations. As illustrated, paradigm 200 includes a requester 102 having a requesting application 108(req) and a responder 104 having a responding application 108(resp) and data 110. Responding application 108(resp) can access and transmit data 110.

Control channel 202 and data channel 204 are established between requesting application 108(req) and responding application 108(resp) over, for example, network 106 (of FIG. 1). Generally, control channel 202 is a two-way communication, and data channel 204 is primarily a one-way communication during any given transfer event. However, there is typically some level of two-way communication for data channel 204 in order to implement a data transfer. Moreover, as described above, results data may be transmitted via data channel 204 from requesting application 108(req) to responding application 108(resp).

In a described implementation, control channel 202 operates in accordance with a first protocol 212, and data channel 204 operates in accordance with a second protocol 214. First protocol 212 differs from second protocol 214. When multiple data channels 204 are being used to transfer data 110, each data channel 204 may be operating under the same second protocol 214 or under different second protocols 214.

A security negotiation 208 is effected between requesting application 108(req) and responding application 108(resp) via control channel 202 with first protocol 212. Security negotiation 208 may include, for example, the negotiation of confidentiality information and/or integrity information for the data transfer. Security negotiation 208 may also involve stipulation of which data channel protocol 214 to use for data channel 204.

To facilitate the data transfer, a linkage or binding 206 is created between control channel 202 and data channel 204. Binding 206 enables data channel 204 to be used for a data transmission 210 responsive to data security information that is negotiated as a result of security negotiation 208. Thus, data 110 is transmitted from responding application 108(resp) to requesting application 108(req) via data channel 204 in accordance with second protocol 214. In other words, the negotiated security creates a binding 206 between security negotiation 208 and data transmission 210 such that security information negotiated via control channel 202 can be applied to data 110 that is transmitted on data channel 204.

Figure 3:
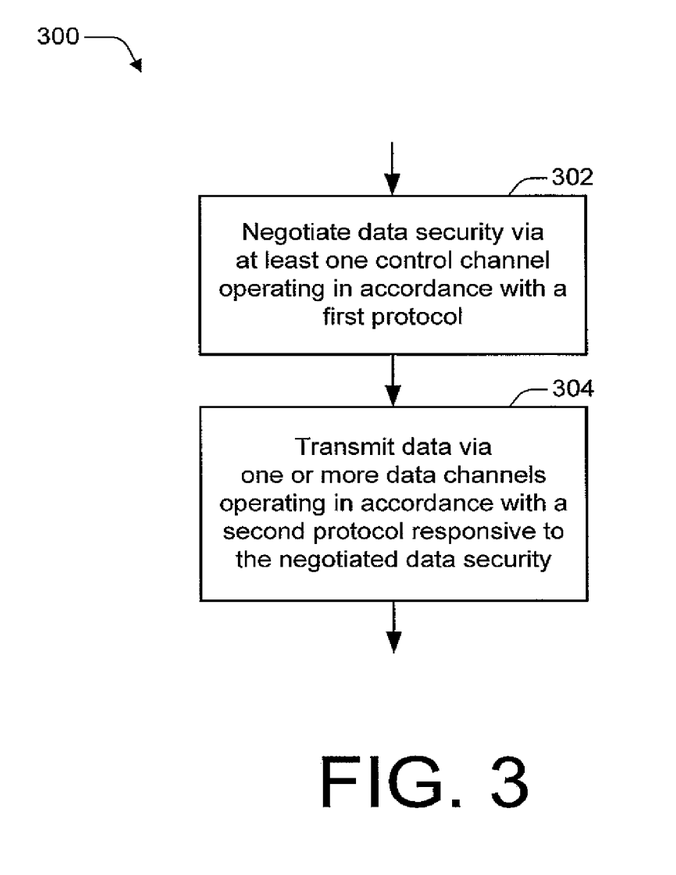
FIG. 3 is a flow diagram that illustrates an example of a general method for transferring data using a control channel and a data channel.

FIG. 3 is a flow diagram 300 that illustrates an example of a general method for transferring data using a control channel and a data channel. Flow diagram 300 includes two (2) blocks 302 and 304. Although the actions of flow diagram 300 may be performed in other environments and with a variety of hardware and software combinations, example environment 100 (of FIG. 1) and example paradigm 200 (of FIG. 2) are used to illustrate an example of the method of flow diagram 300.

At block 302, data security is negotiated via at least one control channel that is operating in accordance with a first protocol. For example, a security negotiation 208 may be effected via a control channel 202 that is operating in accordance with a first protocol 212. The security may be negotiated between, for instance, a requesting application 108(req) and a responding application 108(resp).

At block 304, data is transmitted via one or more data channels that are operating in accordance with a second protocol responsive to the negotiated data security. For example, a data transmission 210 may be effected via a data channel 204 that is operating in accordance with a second protocol 214 responsive to the data security established by security negotiation 208. Data 110 may be transmitted, for instance, from responding application 108(resp) to requesting application 108(req) over network 106 based on binding 206.

The data security as negotiated via the control channel can be implemented using mechanisms provided by the data channel security protocol, by application-level mechanisms using the negotiated security information, some combination thereof, and so forth. The negotiated security can include confidentiality protection, integrity protection, a combination thereof, and so forth. For example, integrity protection may be provided by message digests or digital signatures, and confidentiality protection may be provided by encryption. An example message-based approach for security negotiation is described below with particular reference to FIG. 4.

Figure 4:
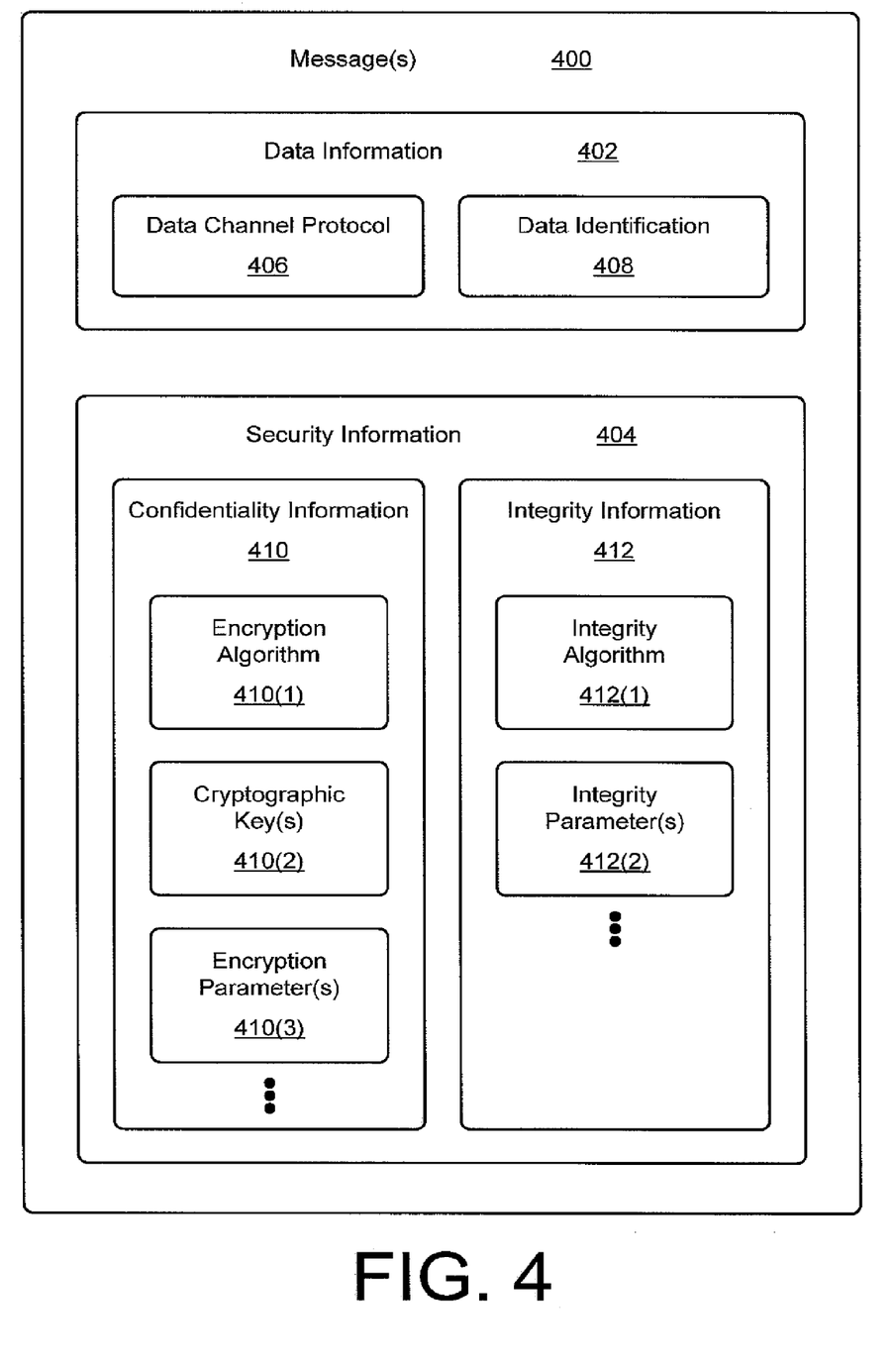
FIG. 4 is a block diagram of an example message format for messages that may be exchanged on a control channel to negotiate security information for data transmission on a data channel.

FIG. 4 is a block diagram of an example message format 400 for messages that may be exchanged on a control channel to negotiate security information for data transmission on a data channel. As illustrated, message format 400 includes data information 402 and security information 404. Message format or message(s) 400 represent an example of how data information 402 and/or security information 404 may be communicated between requesting application 108(req and responding application 108(resp) (of FIG. 2) in a message-oriented manner.

In a described implementation, data information 402 and/or security information 404 may be communicated (e.g., by way of notifications, negotiations, etc.) using one or multiple such messages 400. The different information that is illustrated in FIG. 4 may be realized as blocks, fields, entries, etc. of messages 400. These message(s) 400 are communicated via control channel 202 in accordance with first protocol 212 (of FIG. 2). Messages 400 may include, by way of example but not limitation, data information 402, security information 404, and so forth.

Data information 402 is information that facilitates setting up or establishing a data transfer and that does not directly pertain to confidentiality or integrity for the data being transferred. Data information 402 may include, by way of example but not limitation, data channel protocol 406, data identification 408, and so forth. Data channel protocol 406 stipulates the channel protocol to be used on data channel 204. This stipulated data channel protocol is represented by second protocol 214 in FIG. 2. Data channel protocol entry 406 may stipulate multiple data channel protocols, especially when multiple data channels 204 are being employed. Data identification 408 identifies the data 110 that is the target of a data request from requesting application 108(req).

Using data information 402, the data to-be-transferred and the data channel protocol to-be-used may thus be negotiated. Standard terminology, for example, may be employed here. For instance, standard data identification mechanisms (e.g., file:///repository/data/datafile.dat) and standard data protocol naming conventions (e.g., http://www.w3.org/Protocols/rfc2616/rfc2616.html) may be used.

Security information 404 is information that can be used to provide security for data 110, for example during data transmission 210. Security information 404 may include, by way of example but not limitation, confidentiality information 410, integrity information 412, and so forth. Using security information 404, the data confidentiality and integrity preferences for transferring the data may thus be negotiated. Standard terminology, for example, may be employed here. For instance, standard algorithm identifiers for digital signatures, digest algorithms, and encryption algorithms (e.g., http://www.w3.org/2000/09/xmldsig#rsa-sha1, http://www.w3.org/2000/09/xmldsig#sha1, http://www.w3.org/2001/04/xmlenc#aes128-cbc, etc.) may be used.

Confidentiality information 410 is information that facilitates the creation of confidentiality and/or the maintenance of confidentiality of data 110, especially during data transmission 210. Integrity information 412 is information that enables requesting application 108(req) to check the integrity of data 110 upon receipt. Security negotiation 208 (of FIG. 2) may comprise, at least in part, the exchange of security information 404 between requesting application 108(req) and responding application 108(resp).

Confidentiality information 410 may include, by way of example but not limitation, an encryption algorithm 410(1), at least one cryptographic key 410(2), one or more encryption parameters 410(3), and so forth. Encryption algorithm 410(1) designates an encryption algorithm that is to be used for data transmission 210. Cryptographic key(s) 410(2) specifies encryption and/or decryption keys to be used when encrypting and decrypting data 110 for data transmission 210. The keys may be, for example, symmetric keys, public keys, some combination thereof, and so forth.

The negotiated cryptographic key(s) and encryption algorithm may be used for bulk encrypting the data. Cryptographic key negotiation may use, for example, any number of standard approaches such as Diffie-Helman key negotiation, RSA-based key transport (e.g., http://www.w3.org/2001/04/xmlenc#rsa-oaep-mgf1p), symmetric-key based key wrap algorithms (e.g., http://www.w3.org/2001/04/xmlenc#kw-aes128), and so forth. Encryption negotiation may use, for example, standard block ciphers (e.g., AES, TripleDES, etc.), stream ciphers (e.g., RC4), and so forth. Such negotiations may alternatively reference and/or rely on specialized approaches.

Encryption parameter(s) 410(3) are additional parameters that may be provided by messages 400 for ensuring the confidentiality of the transferred data. Examples of encryption parameters 410(3) include, by way of example but not limitation, 'chunk' sizes and chunk initialization vectors (IVs) when using a block cipher with periodic re-initialization. The IVs may be transmitted via the control channel or in-line by pre-pending them to the encrypted data 'chunks' transmitted via the data channel(s).

Integrity information 412 may include, by way of example but not limitation, an integrity algorithm 412(1), one or more integrity parameters 412(2), and so forth. Integrity algorithm 412(1) designates an integrity algorithm that is to be used for checking whether data 110 has been successfully transmitted without modification by data transmission 210. Example integrity algorithms include, but are not limited to, the SHA-1 or SHA-256 message digest algorithms. These produce a fixed-size value that is unique based on a given binary input data. A typical approach is to compute a digest for each data 'chunk' to be transmitted. These values may be transmitted via the control channel. The integrity of the transmitted data may then be checked by computing the digest of the received data chunk and comparing the computed digest value to the transmitted digest value. It may alternatively be appended to the transmitted data and/or encrypted to prevent undetected modification of both the data and the digest value. The recipient can decrypt the received data and use the decrypted digest to verify the integrity of the decrypted data.

The transmitted integrity digest information may be protected against modification by using it as input to a digital signature computation. Example digital signature algorithms include, by way of example but not limitation RSA_SHA1 or HMAC-SHA1. The resulting signature, and cryptographic keying information for the originator, may be transmitted via the control channel or the data channel and independently verified by the recipient. Use of digital signatures in this manner also provides for proof-of-origin for the transmitted data by allowing one to verify that the creator of the digital signature had access to the transmitted data.

Generally, IVs, cryptographic keys, digest values for chunks, and other such security-related parameters and keys may be communicated in a number of manners. For example, they may be included as part of messages 400 and transmitted via the control channel. They may also be transmitted via the control channel in a separate document or documents. When using a separate document to transmit such security information, the separate document may alternatively be transmitted via the data channel(s). Furthermore, they may be exchanged with reference to a network location (e.g., by URL, etc.) from which the separate document may be retrieved. Using a separate document can reduce the total data size that is transmitted within the control channel messages, which can improve efficiency of the overall data transfer process. When security-related information is communicated over a data channel, they may be communicated using a different data protocol than that used to transfer the application data. For example, IV and digest information values may be transmitted within a document (e.g., of an XML format) using an HTTP protocol while the application data is transmitted over multiple RDMA protocol channels.

Regardless of whether the document(s) are transmitted via the control channel or the data channel(s), the document(s) may also be encrypted and/or transmitted with some level of integrity checks. By way of example but not limitation, an RSA-SHA1 signature may be included over a list of security-related parameters or keys (e.g., digest values accessible using an HTTP protocol). The signature enables one to check the integrity of the received/retrieved list and verify its origin from an entity authorized to provide this data, Regardless, the different types of security-related parameters and keys may be communicated individually or in combination with one another.

The identified requested data, the stipulated data transmission protocol, the security requirements, the specific mechanisms negotiated via the control channel, etc. provide sufficient information for the requestor and responder to establish a binding between the control channel negotiation and a specific data transmission. This binding may be combined with the transmission of integrity information via the control channel operating in accordance with the control channel protocol or via a data channel operating in accordance with some data channel protocol. In combination, they enable the use of the most efficient approaches available to streaming large quantities of binary data.

If no confidentiality is required, then the data may simply be transmitted in the clear. The recipient can check its integrity after receipt if digest information was negotiated and transmitted. The data transfer participants may also rely on integrity protection mechanism(s) provided by the selected data channel protocol. If confidentiality is required, the binary data stream can be efficiently encrypted using, for example, a stream cipher or block cipher in CBC mode. The originator encrypts the data using negotiated cryptographic key information and encryption parameters (e.g., IVs, chunk size, key schedule, etc.) and transmits the data. The recipient receives the encrypted data and decrypts it using the same negotiated key and parameter information. The encryption/decryption operations may be performed by the application outside of the data protocol. If the stipulated data channel protocol supports encryption, then the participants may use the protocol encryption capabilities based on the negotiated encryption parameters.

A described implementation allows applications to make the most appropriate tradeoffs between security requirements and protocol efficiency based on their data requirements. Stronger security mechanisms can be handled at the application layer while allowing use of highly efficient transmission protocols such as RDMA, or integrated data protocol security mechanisms can be used to simplify application-level processing. Described implementation(s) enable these decisions to be dynamically negotiated at runtime based on a given application's current requirements.

Figure 5:
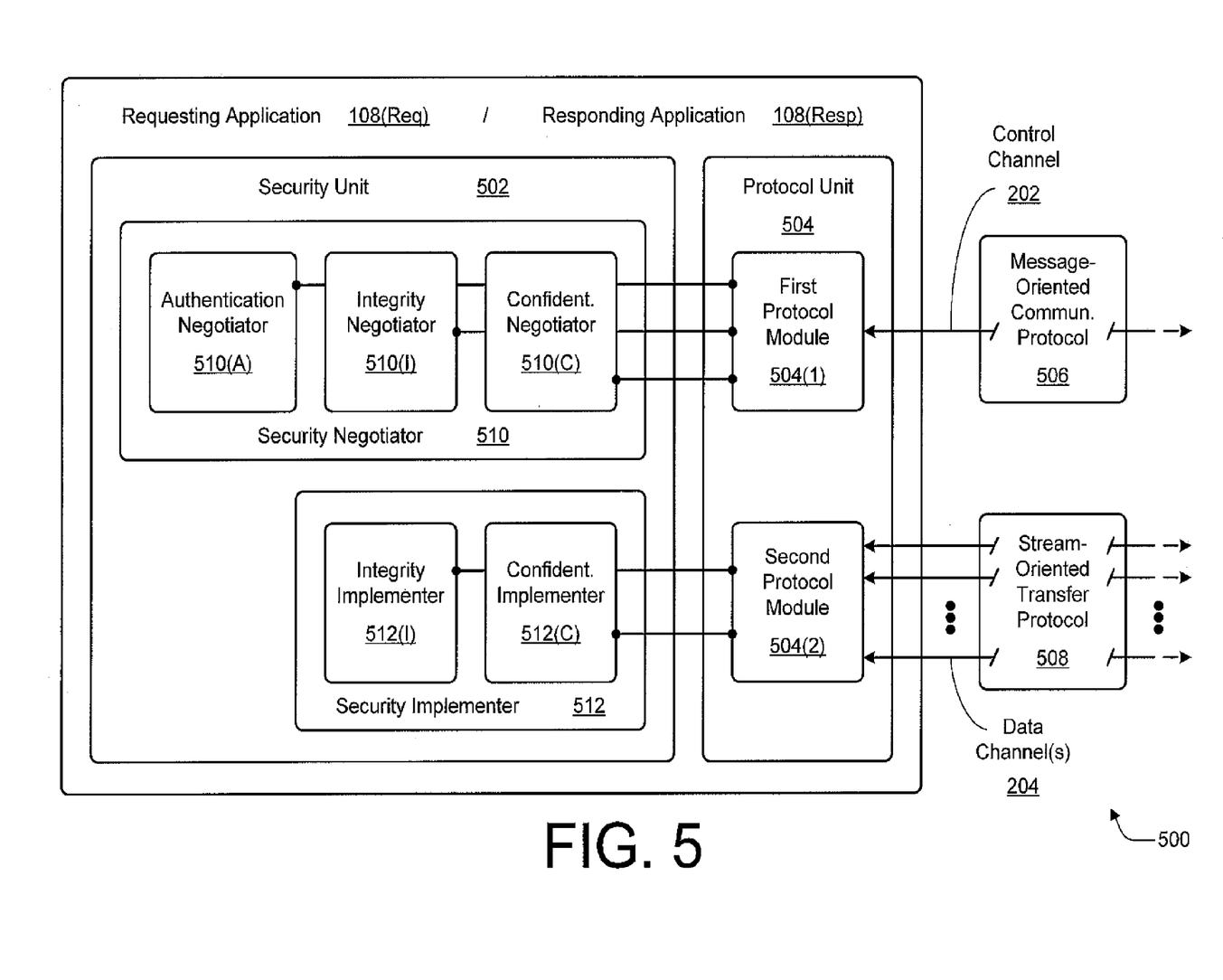
FIG. 5 is a block diagram of an example application having a security unit and a protocol unit that communicate over a control channel and a data channel to facilitate a data transfer.

FIG. 5 is a block diagram 500 of an example application 108 having a security unit 502 and a protocol unit 504 that communicate over a control channel 202 and a data channel 204 to facilitate a data transfer. Application 108 may be a requesting application 108(req) of a requester 102 or a responding application 108(resp) of a responder 104. Generally, the components of application 108 may be realized as hardware, firmware, software, some combination thereof, and so forth.

As illustrated, protocol unit 504 includes a first protocol module 504(1) and a second protocol module 504(2). Security unit 502 generally includes a security negotiator 510 and a security implementer 512. More specifically, security negotiator 510 includes an authentication negotiator 510(A), an integrity negotiator 510(I), and a confidentiality negotiator 510(C). Security implementer 512 includes an integrity implementer 512(I) and a confidentiality implementer 512(C).

In a described implementation, protocol unit 504 is capable of communicating over control channel 202 and one or more data channels 204. More specifically, first protocol module 504(1) is capable of communicating via control channel 202 in accordance with first protocol 212 (of FIG. 2). First protocol 212 may be, for example, a message-oriented communications protocol 506. Second protocol module 504(2) is capable of communicating via data channel 204 in accordance with a second protocol 214 or multiple second protocols 214. Second protocol 214 may be, for example, a stream-oriented transfer protocol 508.

In an example implementation, a message-oriented communications protocol 506 may be a Simple Object Access Protocol (SOAP) or Remote Procedure Call (RPC), and a stream-oriented transfer protocol 508 may be a Remote Direct Memory Access (RDMA) protocol (e.g., RFC 4297) or File Transfer Protocol (FTP) for highly efficient data transfers. However, many other alternative implementations are possible, including those based on industry standard protocols such as Web Services, HTTP, GridFTP, and so forth. Generally, it can usually facilitate user interaction, management, and manipulation of file transfers if first protocol 212 of control channel 202 is human-readable, such as Extensible Markup Language (XML)-based tools. Likewise, it can usually facilitate fast and efficient file transfers if second protocol 214 of data channel 204 operates on binary data.

Security unit 502 is capable of enacting a selected level of data security for data transfers. Security negotiator 510 negotiates security information 404 (of FIG. 4) between a requesting application 108(req) and a responding application 108(resp). More specifically, authentication negotiator 510(A) provides proof of the identity, and associated attributes, of the requesting or responding application 108. Integrity negotiator 510(I) negotiates integrity information 412, and confidentiality negotiator 510(C) negotiates confidentiality information 410. Authentication negotiator 510(A), integrity negotiator 510(I), and confidentiality negotiator 510(C) communicate over control channel 202 using first protocol module 504(1). Messages (e.g., messages 400 of FIG. 4) that are sent over control channel 202 may also be encrypted and/or integrity-protected using different keys and algorithms than those for the data transmissions.

Security implementer 512 implements the data security negotiated by security negotiator 510 for data transmission 210 of data 110. Hence, the negotiated data security is implemented between a requesting application 108(req) and a responding application 108(resp) over data channel(s) 204. More specifically, integrity implementer 512(I) implements the negotiated integrity information 412, such as integrity algorithm 412(1). Confidentiality implementer 512(C) implements the negotiated confidentiality information 410, such as encryption algorithm 410(1). Integrity implementer 512(I) and confidentiality implementer 512(C) communicate over data channel(s) 204 using second protocol module 504(2).

When the application 108 that is illustrated in FIG. 5 is a responding application 108(resp) that is currently transmitting data 110, second protocol module 504(2) may communicate over one or more than one data channel 204. In other words, each responder 104 may be transmitting data 110 over a single data channel 204 or over multiple data channels 204. If the targeted data 110 is being transmitted to a single requester 102, then a requesting application 108(req) thereof may communicate over each of the data channels 204. The number of data channels 204 over which second protocol module 504(2) is currently communicating is analogous when result data is being transmitted from requesting application 108(req).

Figure 6:
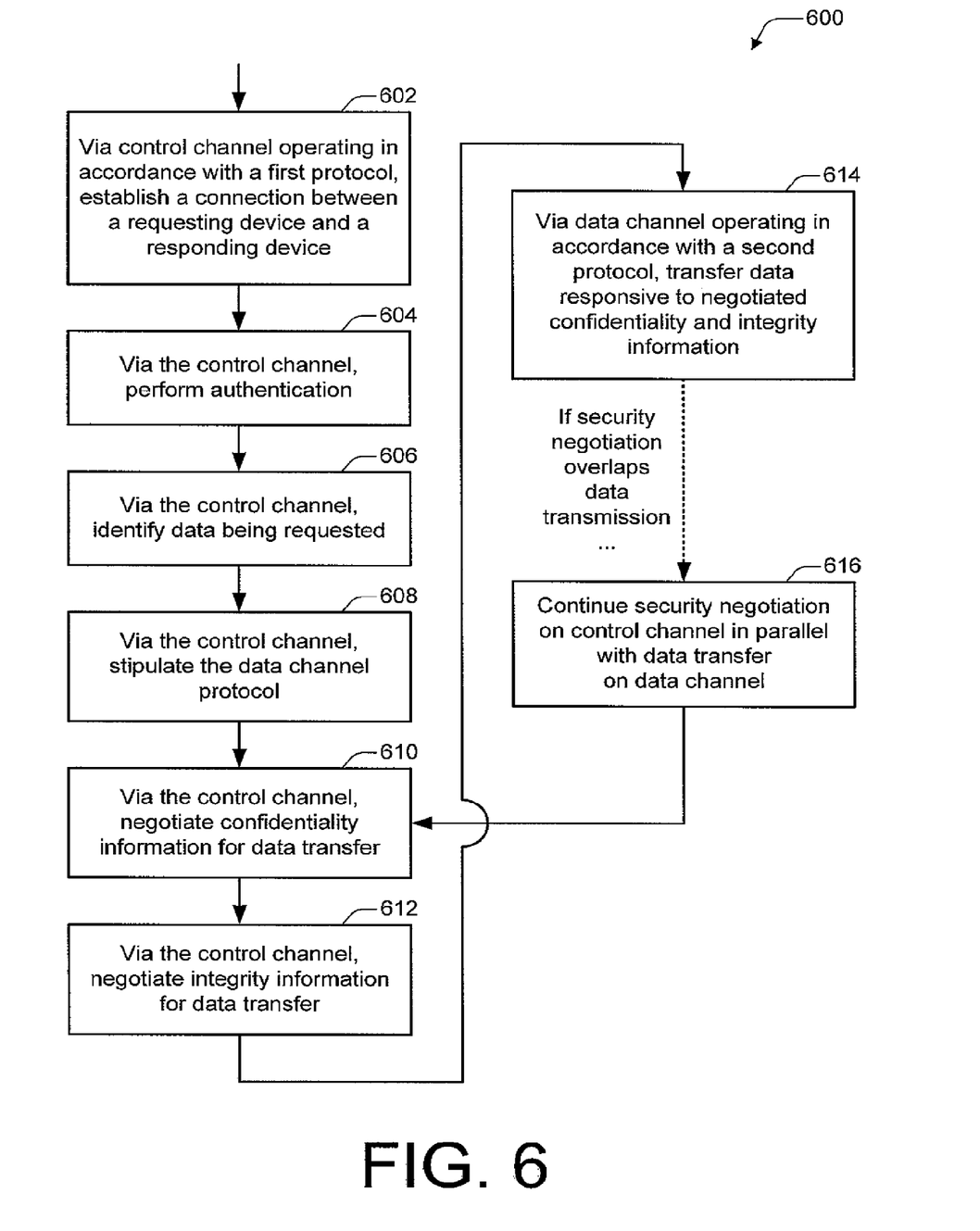
FIG. 6 is a flow diagram that illustrates an example of a more specific method for transferring data using a control channel and a data channel.

FIG. 6 is a flow diagram 600 that illustrates an example of a more specific method for transferring data using a control channel and a data channel. Flow diagram 600 includes eight (8) blocks 602-616. Although the actions of flow diagram 600 may be performed in other environments and with a variety of hardware and software combinations, certain aspects of FIGS. 1-5 are used to illustrate an example of the method of flow diagram 600.

At block 602, via a control channel that is operating in accordance with a first protocol, a connection is established between a requesting device and a responding device. For example, via a control channel 202 that is operating in accordance with a first protocol 212, a connection may be established between a requester 102 and a responder 104. More specifically, for an application-level data transfer 112, a connection may be established between a requesting application 108(req) and a responding application 108(resp).

At block 604, via the control channel, an authentication is performed. For example, requesting application 108(req) and responding application 108(resp) may perform a unilateral or a bilateral authentication process with authentication negotiator 510(A) using security tokens, signed messages, and so forth. For instance, an authentication negotiator 510(A) of requesting application 108(req) may authenticate itself to responding application 108(resp) to demonstrate that it has access rights to the requested data 110. Also, an authentication negotiator 510(A) of responding application 108(resp) may respond to an authentication request from requesting application 108(req) to prove that the data 110 is the targeted data.

Thus, the data requester and/or the responder may be authenticated depending on the application requirements. Standard mechanisms may be employed. For example, message signing using public key cryptography or proof of knowledge of a shared secret (e.g., as adopted by the OASIS SOAP Message Security standard) may be used.

At block 606, the data being requested is identified via the control channel. For example, requesting application 108(req) may send a message 400 having a data identification 408 field to responding application 108(resp). Example message(s) 400 that are described herein with reference to FIG. 6 may be individual messages, a single shared message 400, or some shared messages and some individual messages.

At block 608, a data channel protocol is stipulated via the control channel. For example, requesting application 108(req) may send a message 400 having a data channel protocol field 406 to responding application 108(resp). If the data or protocol is unknown to the data repository, an error may be generated.

At block 610, via the control channel, confidential information for the data transfer is negotiated. For example, requesting application 108(req) may send a message 400 having a confidentiality information 410 field to responding application 108(resp). Hence, an encryption algorithm 410(1) may be designated, cryptographic key(s) 410(2) may be specified, encryption parameters 410(3) may be provided, etc. with confidentiality negotiator 510(C).

At block 612, via the control channel, integrity information for the data transfer is negotiated. For example, requesting application 108(req) may send a message 400 having an integrity information 412 field to responding application 108 (resp). Hence, an integrity algorithm 412(1) may be designated, integrity parameters 412(2) may be provided, etc. with integrity negotiator 510(I). A message 400 having a confidentiality information 410 field for block 610 may be the same as or different from a message 400 having an integrity information 412 field for block 612.

At block 614, via one or more data channels that are operating in accordance with a second protocol, the requested data is transferred responsive to the negotiated confidentiality and integrity information. For example, via data channel(s) 204 that are operating in accordance with a second protocol 214, data transmission 210 of the requested data 110 may be performed with confidentiality implementer 512(C) and integrity implementer 512(I) responsive to confidentiality information 410 and integrity information 412, respectively, that were negotiated via control channel 202. With data transmission 210 initially, a responder 104 transmits data 110, and a requester 102 receives data 110. However, data transmission 210 may also entail result data flowing in the reverse direction.

Security negotiation 208 may at least partially overlap data transmission 210. If security negotiation does overlap the data transmission, then the method of flow diagram 600 continues at block 616. At block 616, the security negotiation is continued on the control channel in parallel with data transfer on the data channel. For example, further security negotiation(s) 208 may be performed via control channel 202 with security negotiator 510 and first protocol module 504(1) while data 110 is being transmitted on data channel(s) 204 with security implementer 512 and second protocol module 504(2).

A security negotiation may result in a new data channel 204 being established between a requestor 102 and a new, or an already active, responder 104. The new data channel 204 may potentially use a different type of data protocol 214. This new data channel operation need not impact data transfers that are already in-progress in response to prior security negotiations.

Thus, flow diagram 600 may repeat at least the action(s) of block 610 and/or block 612 while data is being transmitted by the action(s) of block 614. An example of such parallel security negotiation 208 and data transmission 210 is described further herein with particular reference to FIG. 7. Generally, the actions of flow diagram 600 are continued until a confirmation of a successful data transfer is exchanged or the data transfer is canceled in progress.

In other words, an example usage pattern is to first do the control channel security negotiation, then transmit the data over the data channel(s), and finally send a confirmation. However, one can use the mechanisms described herein as part of a multi-step process in which the initial control channel interaction negotiates security for the first part (e.g., chunk) of a large transfer and delays security negotiation for other parts. Security negotiations for subsequent parts of the data can then occur in parallel with the transmission of the data on the data channel(s). This can increase not only data transfer efficiency, but it can also improve security by allowing the use of different cryptographic encryption keys for different parts of the overall data stream being transferred.

Figure 7:
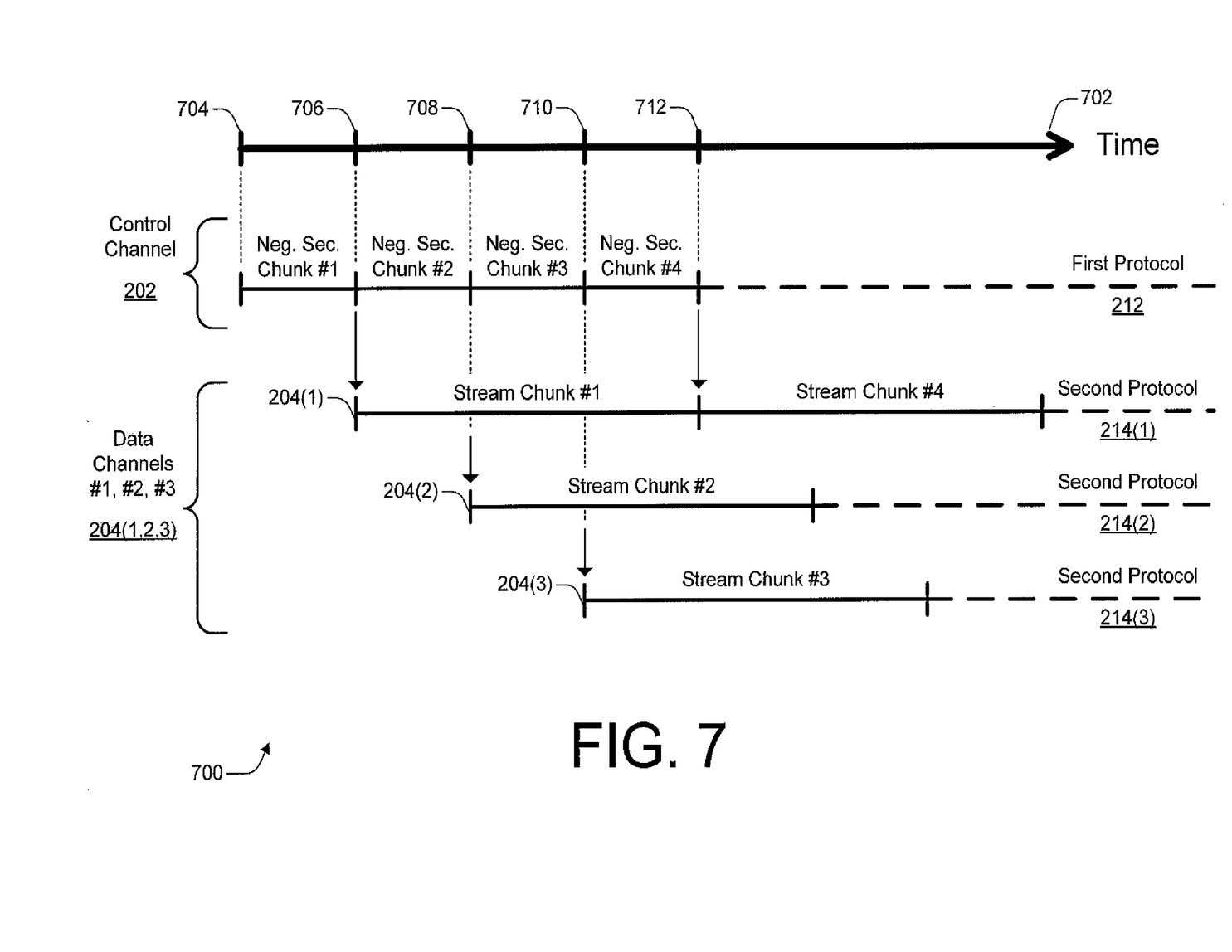
FIG. 7 is a timing diagram illustrating an example of security negotiation on a control channel that is being conducted in parallel with data transmission on data channels.

FIG. 7 is a timing diagram 700 illustrating an example of security negotiation on a control channel 202 that is being conducted in parallel with data transmission on data channels 204. As indicated by arrow 702, a time axis increases in the rightward direction. In an example as illustrated in timing diagram 700, there are three data channels: data channel #1 204(1), data channel #2 204(2), and data channel #3 204(3). Data channels 204(1), 204(2), and 204(3) are operating in accordance with second protocols 214(1), 214(2), and 214 (3), respectively. Second protocols 214(1), 214(2), and 214 (3) may each be the same data channel protocol 214 or may be different data channel protocols 214.

In a described implementation, the targeted data is separable into chunks. The security for each chunk is negotiated sequentially. Each chunk is transmitted in a stream-oriented manner on one of the three data channels 204(1, 2, or 3). Data information 402 (of FIG. 4) may be communicated initially. For example, data channel protocol 406 may be stipulated and the targeted data may be identified with data identification 408 prior to any security negotiation or as part of the initial security negotiation. Alternatively, all or part of data information 402 may be communicated for each chunk along with the respective security negotiation.

Starting at time 704 with control channel 202 and proceeding from left to right with timing diagram 700, the security for chunk #1 is negotiated. For example, security information 404 may be negotiated for chunk #1 of some requested data 110. This security negotiation may include the negotiation of confidentiality information 410 and/or integrity information 412. Upon completion of the security negotiation for chunk #1 at time 706, the streaming of chunk #1 is started via data channel #1 204(1).

While the streaming of chunk #1 is conducted over data channel 204(1), the negotiation of the security for chunk #2 is performed on control channel 202 from time 706 to time 708. Upon completion of the security negotiation for chunk #2 at time 708, the streaming of chunk #2 is started via data channel #2 204(2).

While the streamings of chunks #1 and #2 are conducted over data channels 204(1) and 204(2), the negotiation of the security for chunk #3 is performed on control channel 202 from time 708 to time 710. Upon completion of the security negotiation for chunk #3 at time 710, the streaming of chunk #3 is started via data channel #3 204(3).

While the streamings of chunks #1, #2, and #3 are conducted over data channels 204(1), 204(2) and 204(3), the negotiation of the security for chunk #4 is performed on control channel 202 from time 710 to time 712. At some time, the streaming of chunk #1 on data channel 204(1) is completed. Consequently, upon completion of the security negotiation for chunk #4 at time 712, the streaming of chunk #4 is started via data channel #1 204(1). It should be understood that the completion of the security negotiation for chunk #4 need not be aligned with the completion of the streaming of chunk #1.

In this example manner as illustrated in timing diagram 700, the negotiation of security information may be performed on a control channel 202 in parallel with data transmission on data channels 204(1, 2, and 3). Although three data channels 204 are described in this example, parallel security negotiation 208 and data transmission 210 may be accomplished with any number of data channels 204, each of which may be associated with a different data repository. Even with a single data channel 204, data transmission may start as soon as the security is negotiated for one chunk via control channel 202. Security negotiations for subsequent chunk(s) may be performed via control channel 202 while the one chunk is being transmitted on the single data channel 204.

The overlapping of security negotiation with data transmission may also be utilized in the context of a security step-up procedure. To initiate transmission of a first chunk of data quickly, a faster security mechanism may be negotiated for the first chunk or chunks. A slower, but likely stronger security mechanism, may then be negotiated while this initial chunk(s) is being transmitted. The stronger security may then be implemented on subsequent chunks.

Figure 8:
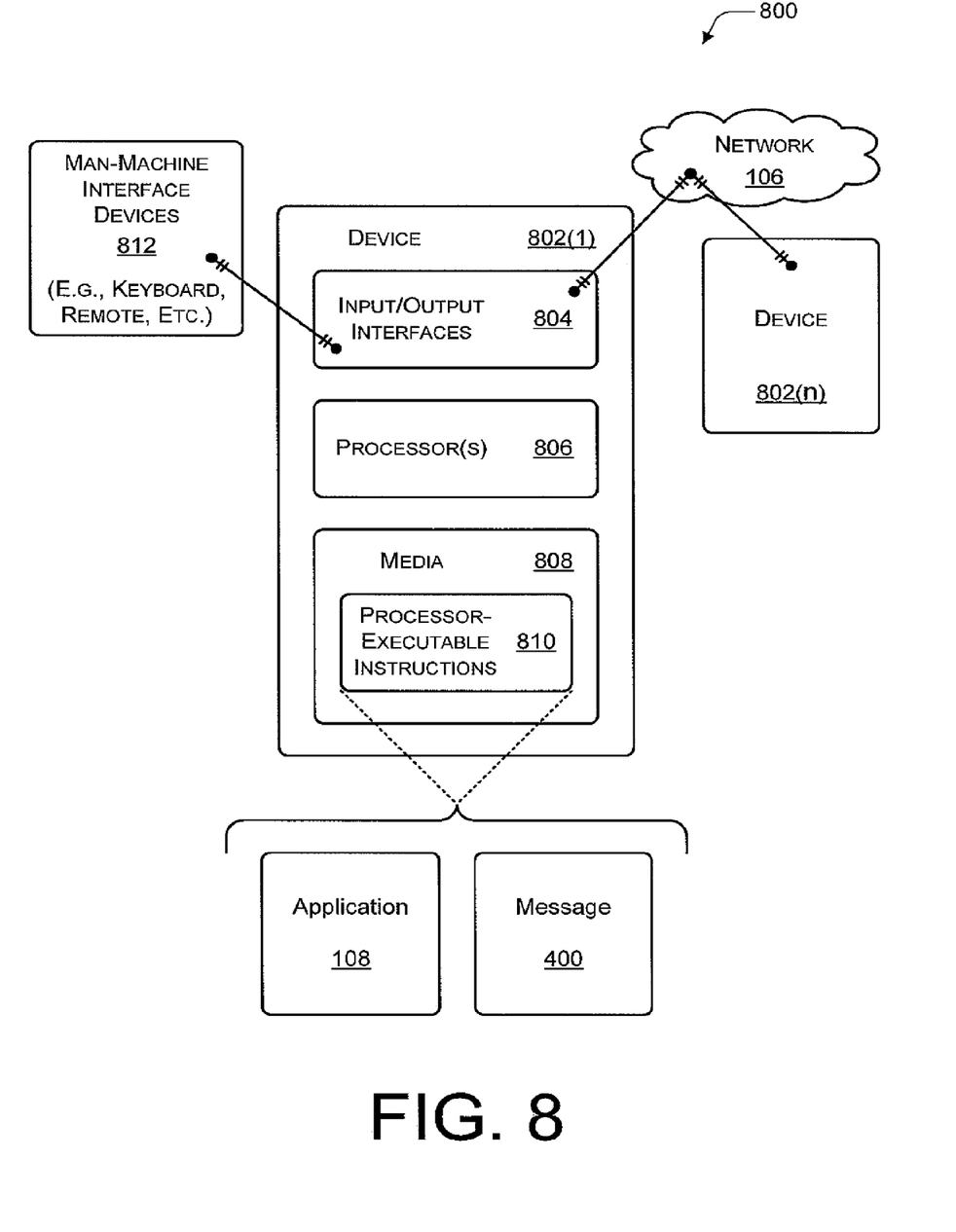
FIG. 8 is a block diagram of an example device that may be used to implement secured data transfers that are supported by separated control and data operations.

FIG. 8 is a block diagram of an example device 802 that may be used to implement secured data transfers that are supported by separated control and data operations. Multiple devices 802 are capable of communicating across one or more networks 106. As illustrated, two devices 802(1) and 802(n) are capable of engaging in communication exchanges, such as data transfers 112, via network 106. Although two devices 802 are specifically shown, one or more than two devices 802 may be employed, depending on implementation. Requesters 102 and responders 104 may be realized as devices 802.

Generally, a device 802 may represent any computer or processing-capable device, such as a server device; a workstation or other general computer device; a data storage repository apparatus; a personal digital assistant (PDA); a mobile phone; a gaming platform; an entertainment device; some combination thereof; and so forth. As illustrated, device 802 includes one or more input/output (I/O) interfaces 804, at least one processor 806, and one or more media 808. Media 808 include processor-executable instructions 810.

In a described implementation of device 802, I/O interfaces 804 may include (i) a network interface for communicating across network 106, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 812 (e.g., a keyboard, a remote, a mouse or other graphical pointing device, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802.

Thus, realizations for secured data transfers that are supported by separated control and data operations may be described in the general context of processor-executable instructions, Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology. Media 808 may be any available media that is included as part of and/or accessible by device 802. It includes volatile and non-volatile media, removable and non-removable media, and storage and transmission media (e.g., wireless or wired communication channels). For example, media 808 may include an array of disks for longer-term mass storage of processor-executable instructions 810, random access memory (RAM) for shorter-term storing of instructions that are currently being executed, link(s) on network 106 for transmitting communications, and so forth.

As specifically illustrated, media 808 comprises at least processor-executable instructions 810. Generally, processor-executable instructions 810, when executed by processor 806, enable device 802 to perform the various functions described herein, including those paradigm(s) that are illustrated in FIG. 2; those actions that are illustrated in flow diagrams 300 and 600 (of FIGS. 3 and 6, respectively); those data structure(s) and application(s) that are illustrated in FIGS. 4 and 5, respectively; and so forth. By way of example only, processor-executable instructions 810 may include an application 108, one or more messages 400, some combination thereof and so forth.

The devices, actions, aspects, features, functions, procedures, modules, data structures, protocols, paradigms, components, etc. of FIGS. 1-8 are illustrated in diagrams that are divided into multiple blocks. However, the order, interconnections, interrelationships, layout, etc. in which FIGS. 1-8 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for secured data transfers that are supported by separated control and data operations.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific featured and acts described above are disclosed as example forms of implementing the claims.

What is claimed is:

1. A device comprising:
one or more processors;
memory coupled to the one or more processors, the memory comprising:
a protocol unit that includes a first protocol module and a second protocol module;
the first protocol module to communicate over at least one control channel in accordance with a message-oriented communication protocol, the second protocol module to communicate over one or more data channels in accordance with a stream-oriented communication protocol, the at least one control channel operating independently and in parallel to the one or more data channels, the one or more data channels utilized to transmit data; and
a security unit comprising:
a security negotiator to negotiate security requirements for a first data portion of a single data transfer request via the at least one control channel with the message-oriented communication protocol and to negotiate security requirements for a second data portion of the single data transfer request while the first data portion is transferred over the one or more data channels in accordance with the stream-oriented communication protocol; and
a security implementer to bind the security requirements for the first data portion of the single data transfer request to the second protocol and to bind the security requirements for the second data portion of the single data transfer request to a different protocol that is associated with a different data channel than the stream-oriented communication protocol.

2. The device as recited in claim 1, wherein the security implementer comprises at least part of a requesting application that receives data via the one or more data channels using the stream-oriented communication protocol module or a responding application that transmits data via the one or more data channels using the second protocol module.

3. The device as recited in claim 1, wherein the security negotiator comprises an integrity negotiator and a confidentiality negotiator; the integrity negotiator to negotiate integrity information via the at least one control channel for use with transmission of the data via the one or more data channels, the confidentiality negotiator to negotiate confidentiality information via the at least one control channel for use with transmission of the data via the one or more data channels.

4. The device as recited in claim 1, wherein the processor-executable instructions further negotiate the stream-oriented communication protocol with a remote application using at least one message.

5. The device as recited in claim 1, wherein the message-oriented communication protocol comprises a Simple Object Access Protocol (SOAP), a Remote Procedure Call (RPC) protocol, or a Web Services protocol and the stream-oriented communication protocol comprises a Transmission Control Protocol/Internet Protocol (TCP/IP) protocol, a Remote Direct Memory Access (RDMA) protocol, a File Transfer Protocol (FTP), or a GridFTP.

6. The one or more processor-accessible storage device as recited in claim 1, wherein the negotiated security requirements for the first portion of the single data transfer comprise confidentiality information or integrity information.

7. The computer-implemented method as recited in claim 6, wherein the confidentiality information comprises an encryption algorithm, at least one cryptographic key, or one or more encryption parameters.

8. One or more computer-readable devices encoded with instructions that, when executed, direct a computing device to perform operations comprising:
   negotiating, via at least one control channel operating in accordance with a message-oriented communication protocol, security information for a first portion of a single data transfer;
   binding the security information for the first data portion of the single data transfer request to a stream-oriented communication protocol, the stream-oriented communication protocol usable to communicate over one or more data channels used to transmit data, the one or more data channels operating independently and in parallel to the at least one control channel;
   negotiating, via the at least one control channel operating in accordance with the message-oriented communication protocol, security information for a second portion of the single data transfer while the first data portion is transferred over the one or more data channels in accordance with the stream-oriented communication protocol; and
   binding the security information for the second data portion of the single data transfer request to a different protocol that is associated with a different data channel than the stream-oriented communication protocol.

9. One or more computer-readable devices as recited in claim 8, wherein the operations further comprise:
   performing, via the at least one control channel operating in accordance with the message-oriented communication protocol, an authentication procedure between a requester and a responder to authenticate the requester of the single data transfer and/or the responder who is to supply the single data transfer.

10. One or more computer-readable devices as recited in claim 8, wherein the operations further comprise:
    identifying, via the at least one control channel operating in accordance with the message-oriented communication protocol, the data to be transferred on the one or more data channels and stipulating the stream-oriented communication protocol to be used for the one or more data channels.

11. One or more computer-readable devices as recited in claim 8, wherein the message-oriented communication protocol comprises a Simple Object Access Protocol (SOAP), a Remote Procedure Call (RPC) protocol, or a Web Services protocol; and wherein the stream-oriented communication protocol comprises a Transmission Control Protocol/Internet Protocol (TCP/IP) protocol, a Remote Direct Memory Access (RDMA) protocol, a File Transfer Protocol (FTP), or a GridFTP.

12. One or more computer-readable devices as recited in claim 8, wherein the negotiated security information for the first portion of the single data transfer comprises an encryption algorithm.

13. One or more computer-readable devices as recited in claim 8, wherein the negotiated security information for the first portion of the single data transfer comprises one or more cryptographic keys for cryptographic operations to be implemented on the first portion of the single data transfer.

14. A computer-implemented method comprising:
    negotiating, via at least one control channel operating in accordance with a message-oriented communication protocol, security information for a first portion of a single data transfer;
    binding the security requirements for the first data portion of the single data transfer request to a stream-oriented communication protocol, the stream-oriented communication protocol usable to communicate over one or more data channels used to transmit data, the one or more data channels operating independently and in parallel to the at least one control channel;
    negotiating, via the at least one control channel operating in accordance with the message-oriented communication protocol, security information for a second portion of the single data transfer while the first data portion is transferred over the one or more data channels in accordance with the stream-oriented communication protocol; and
    binding the security information for the second data portion of the single data transfer request to a different protocol that is associated with a different data channel than the stream-oriented communication protocol.

15. The computer-implemented method as recited in claim 14, further comprising:
    performing, via the at least one control channel operating in accordance with the message-oriented communication protocol, an authentication procedure between a requester and a responder to authenticate the requester of the data stream and/or the responder who is to supply the single data transfer.

16. The computer-implemented method as recited in claim 14, further comprising:
    identifying, via the at least one control channel operating in accordance with the message-oriented communication protocol, the data to be transferred on the one or more data channels and stipulating the stream-oriented communication protocol to be used for the one or more data channels.

17. The computer-implemented method as recited in claim 14, wherein the security negotiation is accomplished by an application using one or more messages.

18. The computer-implemented method as recited in claim 14, wherein the negotiated security information for the first portion of the single data transfer comprises an encryption algorithm.

19. The computer-implemented method as recited in claim 14, wherein the negotiated security information for the first portion of the single data transfer comprises confidentiality information or integrity information.

* * * * *